June 6, 1950 R. G. SCHRIEFER 2,510,144
FREQUENCY MODULATION SYSTEM
Filed Feb. 1, 1947
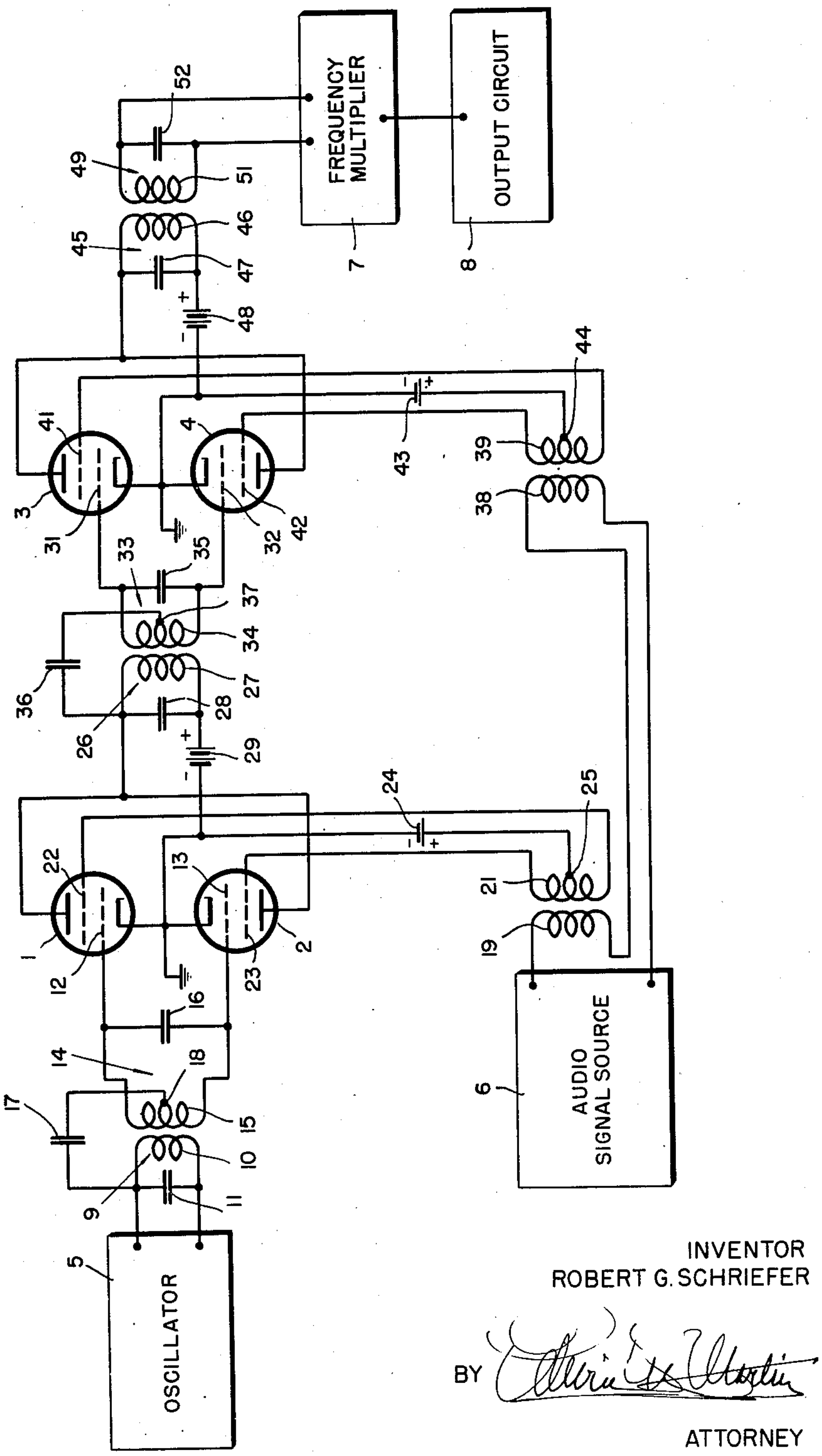
INVENTOR
ROBERT G. SCHRIEFER
BY
ATTORNEY Patented June 6, 1950

2,510,144

UNITED STATES PATENT OFFICE 2,510,144

FREQUENCY MODULATION SYSTEM

Robert G. Schriefer, Fort Wayne, Ind., assignor, by mesne assignments, to Farnsworth Research Corporation, a corporation of Indiana Application February 1, 1947, Serial No. 725,762

4 Claims. (Cl. 332—22)

This invention relates to frequency modulation systems and particularly to systems of this character where the carrier frequency is changed by means of phase shifting under the control of a modulating signal.

One of the more popular conventional frequency modulation systems in present use operates by first shifting the phase of a carrier wave frequency by a relatively small amount, under the control of a modulating signal and then multiplying this frequency many times. The frequency multiplication converts the phase shift of the carrier wave into a frequency modulation in accordance with the modulating signal. In such systems, in order to avoid distortion, the phase shift generally is limited to a maximum of 30 degrees. In general practice, the phase shift is rarely in excess of 25 degrees. In order to produce the desired frequency deviation of the carrier wave, it is necessary to multiply the phase-shifted carrier wave by a factor of several thousand.

It is commonly preferred in practice to generate the carrier wave which is to be phase modulated by means of crystal controlled oscillators. About the lowest practical frequency which can be obtained from apparatus of this character is of the order of 100 kilocycles. In addition, according to present frequency allocations established by the Federal Communications Commission, the frequency modulation channels are in the region of 100 megacycles. It is seen therefore, that if a 100 kilocycle carrier wave were to be multiplied in frequency by a factor of 1000, there would be produced a carrier wave having a frequency of 100 megacycles. However, such a relatively low multiplying factor would produce a frequency deviation at the 100 megacycle carrier frequency which would be only a small fractional part of the 75 kilocycle frequency deviation which the Federal Communications Commission has established as standard. Consequently, when using prior art systems employing a single phase-modulating stage, it is not possible by a straight multiplication process of the carrier wave frequency to develop a carrier wave having the frequency which must be radiated and also having the required frequency deviation. In order to effect the desired result, therefore, it has been necessary, after some frequency multiplication, to convert the frequency-multiplied carrier wave to a carrier wave of lower frequency which in turn is multiplied in frequency still more.

The frequency conversion generally is effected by the use of heterodyne frequency converters.

The frequency conversion, therefore, in the first place, requires the use of additional equipment. In the second place, it is necessary to take suitable precautions against the spurious beat frequencies created by the operation of the frequency conversion apparatus. These precautions generally consist of the provision of tuned circuits, together with suitable shields for certain of the apparatus. Here again is additional apparatus which must be provided.

The use of a heterodyne frequency converter also requires an additional oscillator which, of course, preferably is crystal controlled. Nevertheless, inasmuch as the systems must include at least two oscillators operating generally independently of one another, there is a tendency for the beat frequency which is produced to vary. Since the beat frequency is employed in the production of the frequency which is to be radiated, there cannot be tolerated any frequency variation thereof which is produced as a result of the inconstancy of either one or both of the two oscillators employed to produce it. Therefore, it is common practice to use frequency comparison and control apparatus between the final output circuit and the oscillator used for generating the original carrier wave. Here again is additional apparatus required for the successful operation of systems of the character known in the prior art.

Consequently, there is a need for a system by which to effect phase modulation wherein a much greater degree of phase shift may be produced. Such a system would not require frequency multiplication by factors so great that heterodyne frequency converters are necessary.

It is an object of the present invention, therefore, to provide a novel method of frequency modulation, whereby to obviate the step of reducing the frequency of a phase-shifted carrier wave after some frequency multiplication thereof before additional frequency multiplication is effected.

A further object of the invention is to provide novel apparatus for effecting a phase shift of a carrier frequency of considerably greater than 30 degrees without, at the same time, introducing distortion of the modulating signal.

Another object of the invention is to provide a novel phase modulation system wherein several modulating stages are employed to effect an aggregate phase shift of considerably greater magnitude than 30 degrees.

According to present practice, most phase shift modulation systems require the use of several tubes in the modulating stage. In some cases as many as five tubes are employed to effect the desired phase shift of the carrier wave frequency. In accordance with the multi-stage phase modulation feature of the present invention, several modulating stages may be coupled together to produce the greater total phase shift desired. However, such a system using prior art phase modulators requires a great deal of apparatus since the several tubes required for each modulating stage must be duplicated for each one of such stages. Apparatus of this character, while capable of operating satisfactorily in accordance with the invention, is relatively costly to build, operate and maintain. Therefore, there is a need for a simpler type of phase modulating apparatus wherein the number of tubes and other components is reduced to a minimum.

Therefore, it is another object of the invention to provide a novel phase modulating system comprising no more than two tubes and a relatively small number of other circuit components.

In accordance with the invention, there is provided a novel method of frequency modulation, the first step of which consists of producing a plurality of phase shifts of a carrier wave, each in accordance with a modulating signal. It is preferable that each of the phase shifts be of substantially the same magnitude. Another step of the novel method is the combining of these phase shifts to produce a carrier wave which is shifted in phase in an amount equal to the total of all of the individual phase shifts, thereby effecting a frequency modulation of the carrier wave having a frequency deviation dependent upon the number of phase shifts produced. Finally, if desired, the frequency of the phase-shifted carrier wave may be multiplied to effect a frequency modulation of the carrier wave having a greater frequency deviation.

Also in accordance with the invention, one form of apparatus for carrying out the novel method of frequency modulation comprises a plurality of phase shift modulation stages coupled in cascade to a source of carrier wave. Each of the stages is a balanced modulator and comprises a pair of vacuum tubes. These tubes are excited by the source of carrier wave. The excitation consists of two components. By means of an in-phase component, the two tubes are excited in like phase. Also, by means of quadrature out-of-phase components, the two tubes are excited in opposite phase. With no modulating signal impressed upon the tubes, the two quadrature components are balanced out against one another in the output circuit. The modulating signal is impressed upon the two tubes in opposite phase in a manner to control the respective conductivities of the tubes. The output circuits of the tubes are coupled together in like polarity. As a result, the modulating signal oppositely varies the conductivity of the two tubes. With respect to the in-phase exciting component, there is reproduced in the output circuit of the tubes a corresponding component which does not vary in amplitude or phase with signal modulation. However, with respect to the quadrature exciting components, there are reproduced in the output circuit of the tubes, components which are 180 degrees relative to one another, and 90 degrees respectively relative to the in-phase component and which vary in magnitude in proportion to the conductivities of the respective tubes. There is produced a resultant quadrature voltage which, when combined with the in-phase voltage, develops an output circuit voltage which is shifted in phase from the output circuit voltage resulting from the zero modulation of the tubes.

The phase-shifted output circuit voltage is employed to excite the succeeding modulating stage, the two tubes of which are varied in their respective conductivities under the control of the modulating signal. A sufficient number of such modulating stages are coupled in cascade to produce a carrier wave which is phase-modulated with sufficient deviation that there is required a relatively small frequency multiplication to produce the desired signal frequency deviation. The output circuit of the last signal modulating stage is coupled to a frequency multiplier which, in turn, is coupled to an output circuit.

For a better understanding of the invention, together with other and further objects thereof, reference is made to the following description, taken in connection with the accompanying drawing, and its scope will be pointed out in the appended claims.

The single figure of the accompanying drawing is a schematic circuit diagram of a frequency modulation system, in accordance with the present invention.

Having reference now to the drawing, the phase modulating apparatus consists of two cascade-connected modulating stages. It will be understood that the present disclosure is merely for the purpose of illustrating the underlying principles of the invention. In broadcast practice, where relatively large frequency deviation is desired, more modulating stages will be required to effect enough of a phase shift to obviate the use of heterodyne frequency converters. However, where more modulating stages are used, they may be coupled together and to the source of modulating signal in the same manner as the two stages illustrated herein.

The first phase modulating stage comprises two vacuum tubes 1 and 2 which, as illustrated, may be tetrodes. Similarly, the second of the illustrated modulating stages comprises two tetrodes 3 and 4. The modulating stages are excited initially from a source of carrier wave, such as an oscillator 5. The carrier wave is shifted in phase under the control of a modulating signal such as that derived from an audio signal source 6. The output circuit of the cascaded modulator is coupled to a frequency multiplier 7 which, in turn, is coupled to an output circuit 8 which may, for example, be the power amplifier of a transmitting apparatus.

More specifically, a tuned circuit 9 consisting of a coil 10 and a shunt condenser 11 is connected to the terminals of the oscillator 5 as an output circuit therefor. The circuit 9 is tuned to the oscillator frequency. Also, the control grids 12 and 13 of the first stage modulator tubes 1 and 2 respectively are connected to a tuned exciting input circuit 14 which consists of a coil 15 inductively coupled to the coil 10 and a shunt condenser 16. The circuit 14 also is tuned to the oscillator frequency. Additionally, the oscillator output circuit is coupled by a condenser 17 to a center tap 18 on the coil 15.

The audio signal source 6 is connected to a coil 19 comprising the primary winding of a transformer. Another coil 21 forming the secondary winding of the transformer is inductively coupled to the primary coil 19 and its terminals are connected to the screen grids 22 and 23 of the modulator tubes 1 and 2 respectively. The cathodes of the tubes 1 and 2 are grounded and connected through a source of screen grid voltage, such as a battery 24, to a center tap 25 on the secondary coil 21.

The anodes of the two tubes 1 and 2 are connected together and to one terminal of a tuned output circuit 26 consisting of a coil 27 and a shunt condenser 28. The circuit 26 also is tuned to the oscillator frequency. The cathodes of the tubes 1 and 2 are connected to the negative terminal of a source of space current for the tubes, such as a battery 29, the positive terminal of which is connected to the other terminal of the tuned circuit 26.

In like manner the control grids 31 and 32 of the second stage modulating tubes 3 and 4, respectively, are connected to the terminals of a tuned exciting input circuit 33 comprising a coil 34 and a shunt condenser 35. This circuit also is tuned to the oscillator frequency. The anodes of the tubes 1 and 2 are coupled by a condenser 36 to a center tap 37 on the coil 34.

The audio signal source 6 also is connected to a primary transformer winding 38 which is arranged in series with the first stage primary transformer winding 19. A secondary transformer winding 39 which is inductively coupled to the primary winding 38 has its terminals connected to the screen grids 41 and 42 of the second stage modulating tubes 3 and 4, respectively. The grounded cathodes of the tubes 3 and 4 are connected through a source of screen grid voltage such as a battery 43 to a center tap 44 on the winding 39. The output circuit of the tubes 3 and 4 includes a circuit 45 tuned to the oscillator frequency and consisting of a coil 46 and a shunt condenser 47. One terminal of this output circuit is connected to the anodes of the tubes and the other terminal to the positive pole of a battery 48 which has its negative pole connected to the cathodes of the tube.

Another circuit 49 which is tuned to the oscillator frequency and which consists of a coil 51 and a shunt condenser 52 is inductively coupled to the output circuit 45 of the second modulating stage. The terminals of the circuit 49 are connected to the frequency multiplier 7.

Batteries 24, 29, 44 and 48 have been shown separately in order to simplify the drawing. However, in accordance with well known practice, a single power supply may be employed, if desired. Mutual isolation of the several circuits may be effected by the use of blocking condensers in a conventional manner.

Having reference now to the operation of the described apparatus, the functioning of only the first stage modulating tubes 1 and 2 will be considered in detail since the second stage tubes 3 and 4 operate in a similar manner. By means of the coupling condenser 17 the oscillator frequency is impressed upon the control grids 12 and 13 of the tubes 1 and 2, respectively, in phase. This is the so-called in-phase component referred to. Also, the oscillator frequency is impressed upon the control grids of these tubes by means of the inductive coupling of the coils 10 and 15. By reason of the coupling of the terminals of the coil 15 to the control grids 12 and 13, respectively, the tubes 1 and 2 are excited in opposite phase. This is the so-called quadrature component referred to, by means of which the tubes are excited in a push-pull manner. Also, by reason of the combination of this coupling and the connection of the coupling condenser 17 to the center tap 18 of the coil 15, the quadrature exciting component for the tube 1 is, at a given instance, leading the in-phase component by 90 degrees and, at the same instant, the quadrature component impressed upon the tube 2 is lagging the in-phase component by 90 degrees. As a consequence of this circuit arrangement, with no modulating signals impressed upon the tubes, they are of substantially equal conductivity. In these circumstances, the leading and lagging quadrature components balance one another out in the paralleled output circuits of the tubes. There is, therefore, reproduced in the output circuits of the tubes only the in-phase exciting component.

Now assume that a modulating signal derived from the source 6 is impressed upon these tubes. In view of the push-pull coupling of the coil 21 to the screen grids 22 and 23 respectively of the tubes 1 and 2, the modulating signal is impressed upon these tubes in opposite phase. Consider, for example, the instantaneous condition when the screen grid 22 is more positive than it is in the absence of the modulating signal. At the same time the screen grid 23 of the tube is more negative than it is when no modulating signal is present by the same amount that the screen grid 22 of the tube 1 is more positive. The conductivity of the tube 1 is increased and the conductivity of the tube 2 is decreased by a like amount. As a result, the in-phase component of the exciting voltage, which is impressed upon the tube 1, is increased in magnitude in the output circuit and the in-phase exciting component, which is impressed upon the tube 2, is decreased in the output circuit by substantially the same amount. However, the in-phase components which are reproduced in the output circuits of the tubes combine to produce a voltage of substantially the same magnitude as in the case where no modulating signal is present. Thus, no change is made in the output circuit with respect to the in-phase exciting component with signal modulation applied to the tubes.

Considering now the quadrature exciting components, assume that at a given instant the control grid 12 of the tube 1 is positive, and the control grid 13 of the tube 2 is negative. The leading quadrature component impressed upon the tube 1 is reproduced at increased magnitude in the output circuit. Simultaneously, the lagging quadrature component impressed upon the tube 2 is reproduced in the output circuit at decreased magnitude. It is seen, therefore, that under these conditions the quadrature components do not balance one another out in the output circuit. Instead, there is produced a resultant quadrature component which leads the in-phase component by 90 degrees.

The voltage which is produced in the output circuits of the tubes is the result of the in-phase and the quadrature components. In the assumed case this resultant voltage is advanced in phase from the resultant voltage which is reproduced when no modulating signal is present. The phase angle of advancement of this resultant voltage is dependent upon the relative magnitudes of the reproduced quadrature components which, in turn, are representative of the amplitude of the modulating signal. By suitably proportioning the circuit components, the maximum angle of phase shift may be made no greater than 30 degrees for 100 per cent modulation with low distortion. Obviously, greater phase shifts may be produced where relatively narrow band operation is desired and signal distortion is not a primary consideration. With the present facilities, the phase angle can be varied over a range of plus or minus 80 degrees without difficulty.

The phase-shifted voltage developed in the output circuit of the tubes 1 and 2, comprising the first phase modulating stage, is coupled to the tubes 3 and 4 of the succeeding phase-modulating stage in substantially the same manner as the oscillator 5 is coupled to the tubes of the first stage. Hence, effectively the successive stages of the modulating system are excited in a series or cascade arrangement. The modulating signal derived from the source 6, however is coupled by means of the transformer windings 38 and 39 to the screen grids of the tubes 3 and 4 in substantially the same manner as the audio signal source is coupled to the first stage tubes 1 and 2. Hence, the modulating signal is coupled to the successive stages of the modulating system effectively in a parallel circuit arrangement. The second modulating stage effects a further phase shift of the carrier wave so as to produce in the output circuit of the second stage a voltage which is shifted in phase from that derived from the oscillator 5 through an angle which is substantially equal to twice the angle of phase shift capable of being produced by either one of the modulating stages.

It is evident that, by providing a sufficient number of modulating stages such as the two described coupled together in cascade with respect to the exciting voltage and in parallel with respect to the modulating voltage, a total phase shift may be produced which, in magnitude, is approximately equal to the product of the phase shift of one stage and the number of stages. Ordinarily five or six of such cascaded modulating stages are sufficient to produce an adequate phase shift of the carrier wave so that only a relatively small amount of frequency multiplication is required to produce the desired frequency deviation in the output circuit. In this manner there is no need to employ apparatus such as heterodyne frequency converters in order to effect the frequency deviation desired. It is apparent, furthermore, that the provision of a relatively simple phase modulating circuit minimizes the apparatus required and makes it feasible, as well as economical, to employ a number of such modulating stages.

While there has been described what, at present, is considered the preferred embodiment of the invention, it will be obvious to those skilled in the art that various changes and modifications may be made therein without departing from the invention, and it, therefore, is aimed in the appended claims to cover all such changes and modifications as fall within the true spirit and scope of the invention.

What is claimed is:

1. A frequency modulation system comprising, a source of carrier wave, a plurality of phase-modulating stages, means including said carrier wave source for exciting the first of said modulating stages both with an in-phase carrier wave component and with quadrature out-of-phase carrier wave components, means including the respective immediately preceding modulating stages for exciting the others of said modulating stages both with an in-phase carrier wave component and with quadrature out-of-phase carrier wave components, a source of modulating signal, means including said modulating signal source for effecting a phase modulation of the respective exciting carrier waves of all of said modulating stages, and means for multiplying the frequency of the phase-modulated carrier wave derived from the last one of said modulating stages.

2. A frequency modulation system comprising, a source of carrier wave, a plurality of phase-modulating stages coupled together in cascade, said modulating stages being substantially similar and each having an exciting input circuit, a modulating input circuit and an output circuit, means including said carrier wave source for impressing upon the exciting input circuit of the first of said modulating stages both an in-phase carrier wave component and quadrature out-of-phase carrier wave components, means for coupling the exciting input circuits of each of the others of said modulating stages to the output circuits of the immediately preceding modulating stages to excite each of said other stages both with an in-phase carrier wave component and with quadrature out-of-phase carrier wave components, a source of modulating signal, means including said modulating signal source for impressing a modulating signal upon the modulating input circuits of all of said modulating stages, a frequency multiplier, and means for coupling the output circuit of the last one of said modulating stages to said frequency multiplier.

3. A frequency modulation system comprising, a source of carrier wave, a plurality of phase-modulating stages coupled together in cascade, said modulating stages being substantially similar and each including two vacuum tubes, each of said tubes having an exciting input circuit, a modulating input circuit and an output circuit, means for coupling the exciting input circuit of the first of said modulating stages to said carrier wave source to excite said two tubes with an in-phase carrier wave component and with quadrature out-of-phase carrier wave components, means for coupling the exciting input circuits of each of the others of said modulating stages to the output circuits of the immediately preceding modulating stages to excite said other stages both with an in-phase carrier wave component and with quadrature out-of-phase carrier wave components, a source of modulating signal, means for coupling said modulating signal source to the modulating input circuits of all of said modulating stages, a frequency multiplier, and means for coupling the output circuit of the last one of said modulating stages to said frequency multiplier.

4. A frequency modulation system comprising, a source of carrier wave having an output circuit, a plurality of phase-modulating stages coupled together in cascade, said modulating stages being substantially identical and each including two vacuum tubes, each of said tubes having a cathode, an anode, a control grid and a screen grid, each of said modulating stages also having an exciting input circuit including said control grids, a modulating input circuit including said control grids and an output circuit including said anodes and said cathodes, means for coupling the exciting input circuit of the first of said modulating stages to the output circuit of said carrier wave source to excite said two tubes with an in-phase carrier wave component and with quadrature out-of-phase carrier wave components, means for coupling the exciting input circuits of each of the others of said modulating stages to the output circuits of the immediately preceding modulating stages to excite said other modulating stages both with an in-phase carrier wave component and with quadrature out-of-phase carrier wave components, a source of modulating signal having a plurality of output circuits, means for coupling the respective output circuits of said modulating signal source to the modulating input circuits of all of said modulating stages, a frequency multiplier having an input circuit, and means for coupling the output circuit of the last one of said modulating stages to the input circuit of said frequency multiplier.

ROBERT G. SCHRIEFER.

REFERENCES CITED

The following references are of record in the file of this patent:

UNITED STATES PATENTS

| Number | Name | Date |
|---|---|---|
| 1,550,660 | Affel | Aug. 25, 1925 |
| 1,747,160 | Carpe | Feb. 18, 1930 |
| 1,926,875 | Llewellyn | Sept. 12, 1933 |
| 2,112,881 | Crosby | Apr. 5, 1938 |
| 2,135,946 | Mountjoy | Nov. 8, 1938 |
| 2,220,201 | Bliss | Nov. 5, 1940 |
| 2,250,296 | Crosby | July 22, 1941 |
| 2,351,463 | Usselman | June 13, 1944 |
| 2,436,834 | Stodola | Mar. 2, 1948 |